US005870993A

United States Patent [19]
Stellet et al.

[11] Patent Number: 5,870,993
[45] Date of Patent: Feb. 16, 1999

[54] METHOD AND APPARATUS FOR OPERATING A SPARK-IGNITED RECIPROCATING-PISTON INTERNAL COMBUSTION ENGINE

[75] Inventors: Hans-Peter Stellet, Braunschweig; Helmut Endres, Gifhorn, both of Germany

[73] Assignee: Volkswagen AG, Wolfsburg, Germany

[21] Appl. No.: 879,266

[22] Filed: Jun. 20, 1997

[30] Foreign Application Priority Data

Jun. 20, 1996 [DE] Germany ............... 196 24 547.8

[51] Int. Cl.$^6$ ............................................ F02B 47/08
[52] U.S. Cl. ................... 123/308; 123/315; 123/568
[58] Field of Search ............................ 123/308, 315, 123/568, 661, 671

[56] References Cited

U.S. PATENT DOCUMENTS

| | | | |
|---|---|---|---|
| 1,866,703 | 7/1932 | Gehres | 123/306 |
| 4,354,463 | 10/1982 | Otani et al. | 123/308 |
| 4,359,972 | 11/1982 | Calkins | 123/41.08 |
| 4,700,684 | 10/1987 | Pischinger et al. | 123/568 |
| 4,732,118 | 3/1988 | Tanahashi et al. | 123/65 VD |
| 4,905,646 | 3/1990 | Tanahashi | 123/295 |
| 5,255,649 | 10/1993 | Isaka | 123/308 |
| 5,379,743 | 1/1995 | Stokes et al. | 123/568 |

FOREIGN PATENT DOCUMENTS

| | | |
|---|---|---|
| 0063305 | 10/1982 | European Pat. Off. . |
| 2703107 | 3/1993 | France . |
| 2125368 | 5/1970 | Germany . |

*Primary Examiner*—Tony M. Argenbright
*Assistant Examiner*—Hieu T. Vo
*Attorney, Agent, or Firm*—Baker & Botts, L.L.P.

[57] ABSTRACT

To reduce fuel consumption and exhaust emissions in an internal combustion engine a comparatively large quantity of exhaust gas is recirculated and a specific swirling flow is imposed on the exhaust gas as it is introduced into the combustion chamber. For this purpose the exhaust duct has a chamfer formed on only one side in the region of a flow cross-section. The swirling flow of exhaust gas rotating about an axis parallel to the cylinder axis, together with the supply of fresh gas, assures an increased fresh-gas concentration in the region of the spark plug.

16 Claims, 3 Drawing Sheets

METHOD AND APPARATUS FOR OPERATING A SPARK-IGNITED RECIPROCATING-PISTON INTERNAL COMBUSTION ENGINE

BACKGROUND OF THE INVENTION

This invention relates to methods and apparatus for operating spark-ignited reciprocating-piston internal combustion engines in which the flow of intake and exhaust gases is controlled by periodically actuated intake and exhaust valves and exhaust gases are recirculated.

German Offenlegungsschrift No. 2 125 368 discloses an arrangement for internal exhaust gas recirculation in an internal combustion engine in which periodically actuated intake and exhaust valves are controlled in such a way that, during the opening of the intake valve, the exhaust valve is opened briefly by an additional lobe on an exhaust valve control cam and, as a result, exhaust gas is recirculated from an exhaust duct into the combustion chamber by the downward motion of the reciprocating piston during the overlap phase between the intake valve and the exhaust valve. At idling speeds, this actuation of the exhaust valve during the intake stroke ceases, this being accomplished by operation of hydraulic regulating tappets. This appears to provide a possible improvement in the smoothness of operation of the internal combustion engine resulting from increased turbulence in the fresh-gas charge, i.e., by the homogenization of the fresh gas supplied as a result of the exhaust gas introduction. There is no indication in this disclosure as to how the gases are guided in the internal combustion engine.

European published application No. 0 063 305 A1 discloses a spark-ignited reciprocating-piston internal combustion engine having an adjustable-stroke intake valve which is recessed relative to the combustion chamber in order to burn leaner mixtures. To obtain reliable ignition of the lean mixture, a chamfer is arranged in the form of a guide duct provided on one side in the region of the transition from the inlet cross-section of the intake duct to the combustion chamber, and this guide duct guides the induced mixture toward the spark plug.

SUMMARY OF THE INVENTION

Accordingly, it an object of the present invention to provide a method and apparatus for operating a spark-ignited reciprocating-piston internal combustion engine which overcomes disadvantages of the prior art.

Another object of the invention is to provide a method and an apparatus for operating a spark-ignited reciprocating-piston internal combustion engine which achieves significant reductions in fuel consumption, especially in the partial-load operating range, and wherein an undesired increase in HC and CO emissions is avoided without causing any disadvantages in the full-load operating range.

These and other objects of the invention are attained by providing exhaust gas recirculation arranged to produce charge stratification in the combustion chamber so that the fresh gas concentration is increased in the vicinity of the spark plug. This results in a significant reduction in fuel consumption, especially in the partial-load operating range, and the internal recirculation of comparatively high quantities of exhaust gas simultaneously avoids increases in HC and CO emissions. The high tolerance of the combustion method used herein for recirculated exhaust is achieved by the use of a specific charge stratification of exhaust gas and fresh gas, largely avoiding homogenization.

To recirculate a comparatively large quantity of exhaust gas from the exhaust duct, the exhaust gas valve lift curve, and optionally the intake valve lift curve, is adjusted in the direction of a retarded crank angle, i.e., it is shifted to a large extent into the intake stroke of the cylinder, so that the downward movement of the reciprocating piston produces a sufficient vacuum to draw in significant quantities of exhaust gas. To assure that this comparatively large quantity of exhaust gas does not result in a mixture which is difficult to ignite in the combustion chamber, the invention furthermore provides a swirling flow of the recirculated exhaust gas which rotates about an axis extending parallel to the direction of motion of the reciprocating piston. This swirling flow, together with the quantity of fresh gas flowing in through the intake valves, leads to a specific charge stratification in the combustion chamber so that an increased fresh gas concentration is available in the vicinity of the spark plug for the combustion chamber.

It is thus important to the invention that a comparatively large quantity of exhaust gas is recirculated from the exhaust duct. This is achieved by a specific shift in the exhaust valve lift curve, and optionally the intake valve lift curve, relative to the crank angle, and the recirculated exhaust gas has a specific swirling flow imposed on it as it flows out of the exhaust duct which, together with the inflowing stream of the fresh gas, brings about a charge stratification in such a way that there is a readily ignited mixture in the vicinity of the spark plug.

The invention can be employed both with internal combustion engines having two valves per combustion chamber, i.e. having one intake valve and one exhaust valve, and with multi-valve internal combustion engines. Since, in the case of two-valve internal combustion engines, only one camshaft is generally used to control both the intake and exhaust valves, that camshaft can be adjusted overall relative to the crank angle to provide a comparatively simple embodiment, so that both the exhaust valve lift curve and the intake valve lift curve are adjusted synchronously. Such synchronous adjustment is advantageous since an improved and increased stratification/concentration gradient is established in this case whereas in the case of adjustment exclusively of the exhaust-valve lift curve, a tendency towards homogenization, which is undesirable per se, is observed in certain regions of the combustion chamber.

The swirling flow imposed upon the recirculated exhaust gas is preferably produced by appropriate configuration of the exhaust duct, and this involves an arrangement similar to that previously provided solely to the configuration of the intake duct to promote swirling of the fresh gas mixture.

In a particularly preferred embodiment, at least one of the exhaust valves, together with the corresponding exhaust duct flow cross-section, is recessed relative to the combustion chamber and a chamfer is provided along one side of the duct between this flow cross-section and the combustion-chamber land. The chamfer is arranged so that, because of the presence of the chamfer on one side and the absence of a chamfer on the opposite side, the exhaust gas which emerges and is recirculated flows into the combustion chamber in a defined direction tangential to the cylinder axis, particularly in the case of small valve strokes of the exhaust valves. This sets up a pronounced rotation of the recirculated exhaust gases in the combustion chamber.

In an advantageous embodiment, where there are a plurality of exhaust valves per combustion chamber, e.g. two per combustion chamber, it is furthermore possible for the flow directions provided by the chamfers to be a mirror image, giving rise to a corresponding number of swirling flows rotating in opposite directions to one another about parallel axes.

In the case of multi-valve internal combustion engines, provision can preferably be made for at least one of the exhaust valves to be capable of being decoupled from the periodic drive by the camshaft, making it possible to increase the swirl of the exhaust gas in a specifically intended manner by virtue of an asymmetric inflow. In a further advantageous arrangement utilizing a deactivatable exhaust valve, provision can be made for only the exhaust valve which is not deactivated to have the abovementioned chamfer.

In the simplest case, the flow motion imposed upon the fresh gas flowing in through the intake valve or valves is that set up by virtue of a conventional duct configuration. In this context, the position of the intake cross-section is important for the charge stratification.

Preferably the fresh gas intake is arranged to impose a swirling flow with a comparatively low level of swirl in comparison with the swirling flow of the exhaust gas.

For a multi-valve internal combustion engine, the fresh gas preferably has a tumbling flow imposed upon it, i.e., the fresh gas rotates about an axis running transversely to the cylinder axis. In a further advantageous arrangement, the intensity of the tumbling flow can be adjusted by flaps arranged, for example, in the intake ducts.

In a further advantageous embodiment for multi-valve internal combustion engines with at least two exhaust valves, provision can be made for at least one of the exhaust valves to close prematurely. For this purpose, a corresponding cam is provided with a flank which closes one valve prematurely relative to the other exhaust valve cam.

The adjustment of the exhaust and/or intake valve lift curves can be effected using any conventional arrangement for shifting such curves relative to the crank drive angle. This shift can be performed either with a so-called two-point positioning device or with a device movable to any point in a range.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1B:
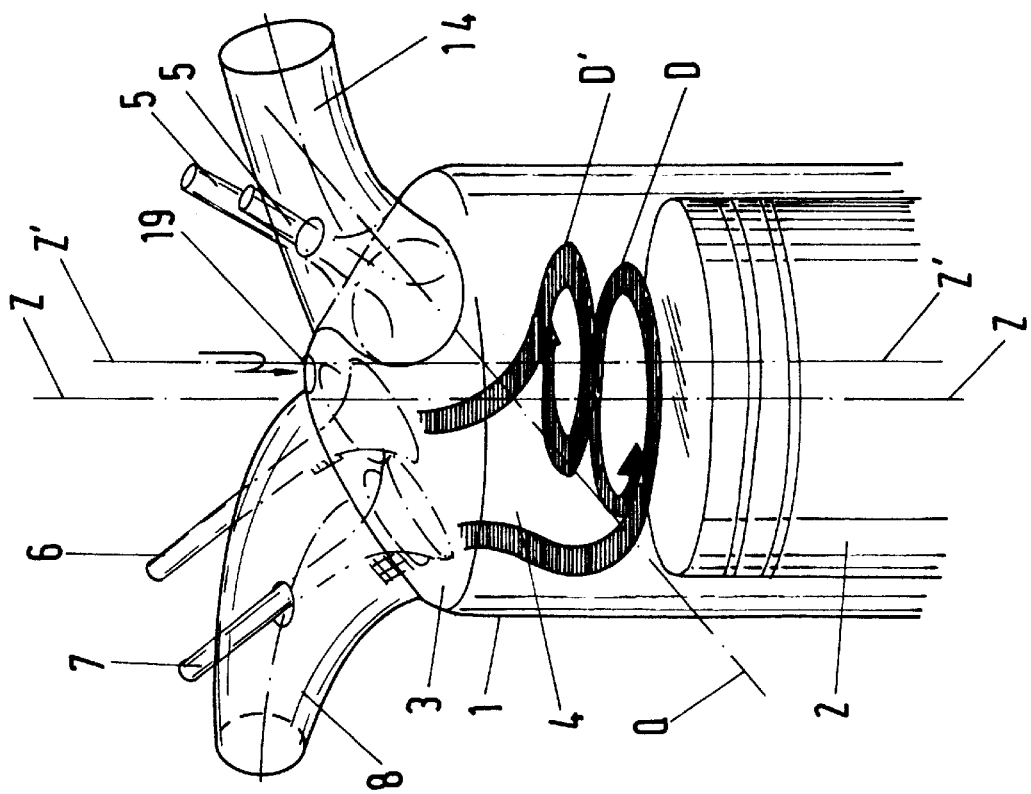
FIG. 1b is a perspective and schematic view illustrating a representative embodiment of another multi-valve internal combustion engine according to the invention.
Figure 1A:
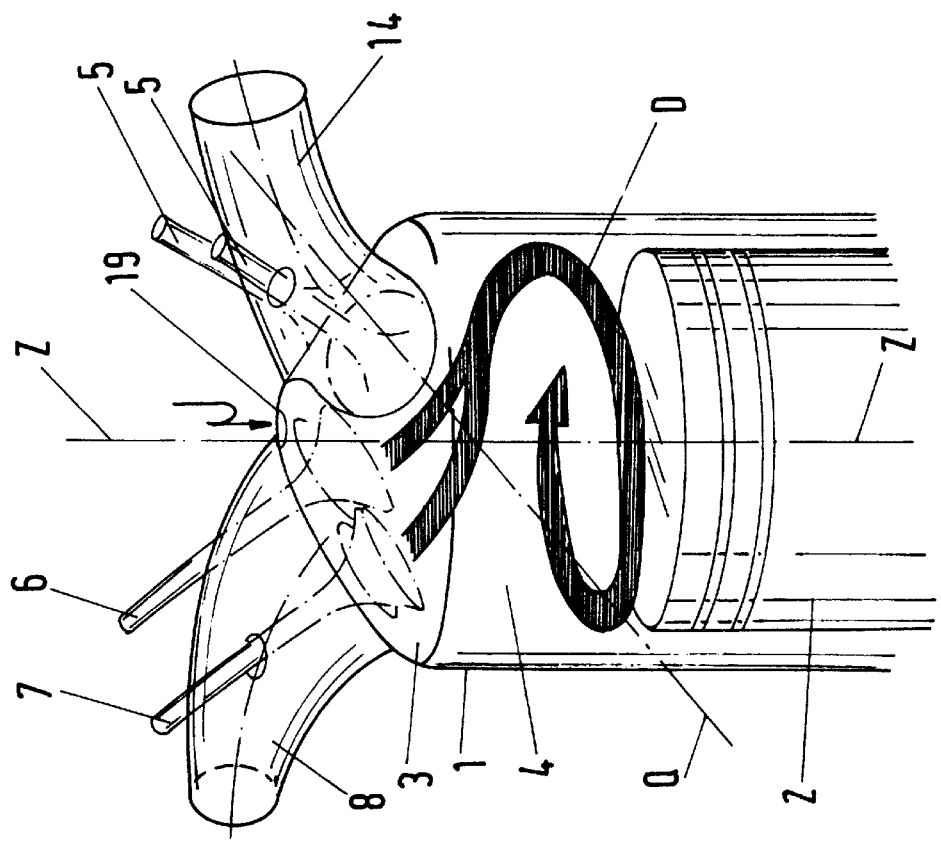
FIG. 1a is a perspective and schematic view illustrating a representative embodiment of a multi-valve internal combustion engine in accordance with the invention.

In the typical embodiment of the invention shown in FIG. 1a, a spark-ignited reciprocating-piston internal combustion engine includes a cylinder 1 in which a piston 2 is slideably mounted. A combustion chamber 4 defined between the piston 2 and a combustion-chamber land 3 is supplied with fresh fuel gas through two intake valves 5 mounted in an intake duct 14.

The combustion exhaust gases are discharged from the combustion chamber 4 through two exhaust valves 6 and 7 mounted in an exhaust duct 8. The intake valves 5 and the exhaust valves 6 and 7 are driven periodically in a conventional manner by cams on one or more camshafts (not shown) which are driven in conjunction with the crankshaft of the internal combustion engine.

Figure 5:
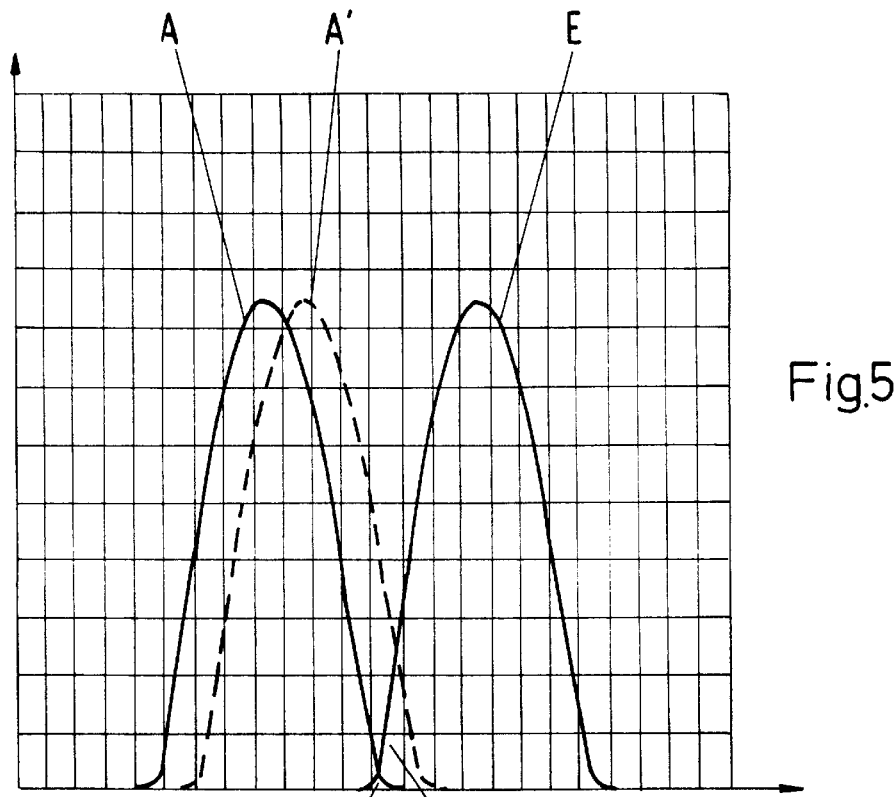
FIG. 5 is a graphical representation showing valve lift curves with a shifted exhaust-valve lift curve.

The variation with time of the valve lift against the crank angle of the crankshaft is illustrated in FIG. 5 in the form of an exhaust valve lift curve A and an intake valve lift curve E. Between the curves A and E therein is a comparatively small valve overlap phase 9.

A conventional arrangement for changing the position of at least the exhaust valve lift curve A relative to the crank angle is provided between the crankshaft and the camshaft in such a way that the lift curve can be shifted to the curve position indicated by A', thereby establishing an enlarged valve overlap phase 10. The arrangement for changing the position of the valve lift curve relative to the crank angle can also be employed in such a way that both camshafts of a multi-valve engine are adjusted synchronously as shown by the shifted curves A' and E' in FIG. 6.

Figure 2:
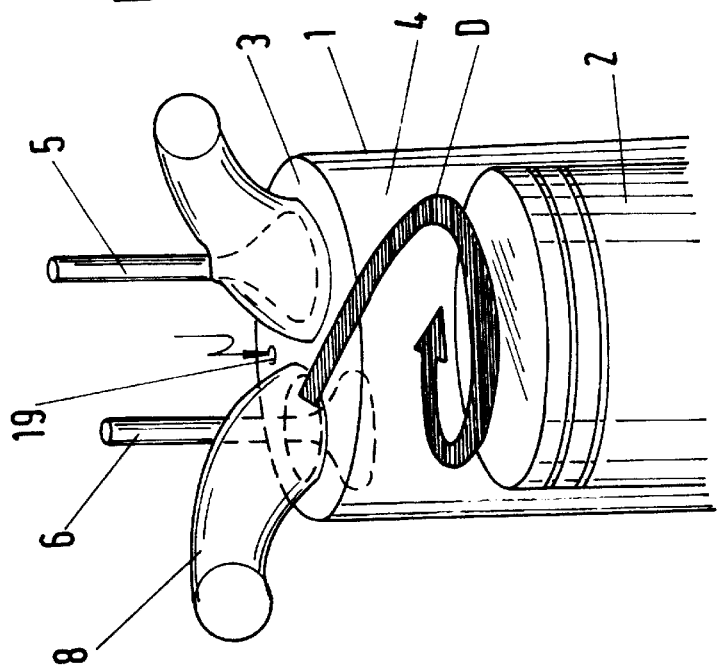
FIG. 2 is a perspective and schematic view illustrating a representative embodiment of a two-valve internal combustion engine according to the invention.
Figure 6:
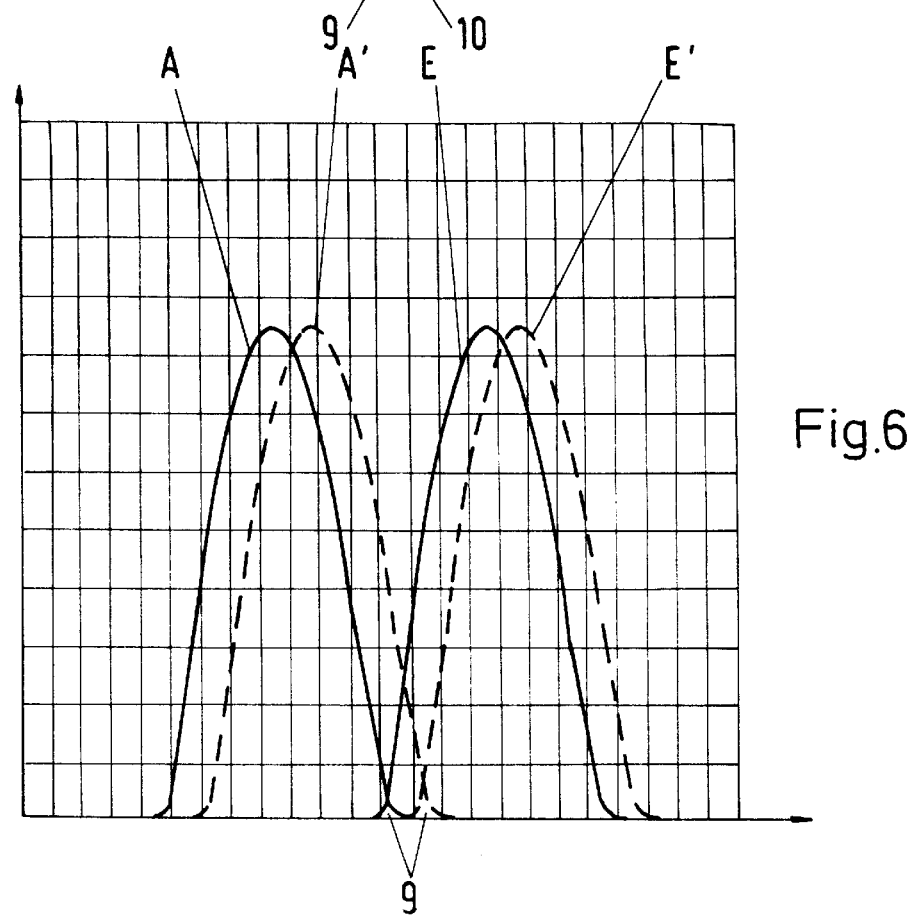
FIG. 6 is a graphical representation showing valve lift curves with two shifted curves.

When a valve lift curve shifting arrangement is used with cylinders 1 having only two gas exchange valves as shown in FIG. 2 and having one camshaft with cams arranged rigidly thereon, the change in position relative to the crank angle produces the curve shifts shown in FIG. 6, in which both the exhaust-valve lift curve A and the intake valve lift curve E are shifted by the same amount to the positions A' and E', with the result that there is no change in the valve overlap phase 9.

The intake and exhaust valves 5, and 6 and 7, respectively, each control the flow through corresponding flow cross-sections 13 of the intake duct 14, and 15 and 16 of the exhaust duct 8, the flow cross-sections being provided with corresponding valve seat rings 11 and 12.

Figure 4:
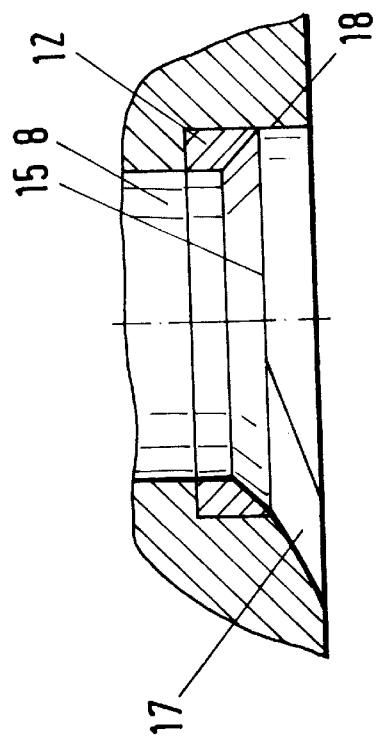
FIG. 4 is a sectional view taken along the line IV—IV of FIG. 3 and looking in the direction of the arrows.
Figure 3:
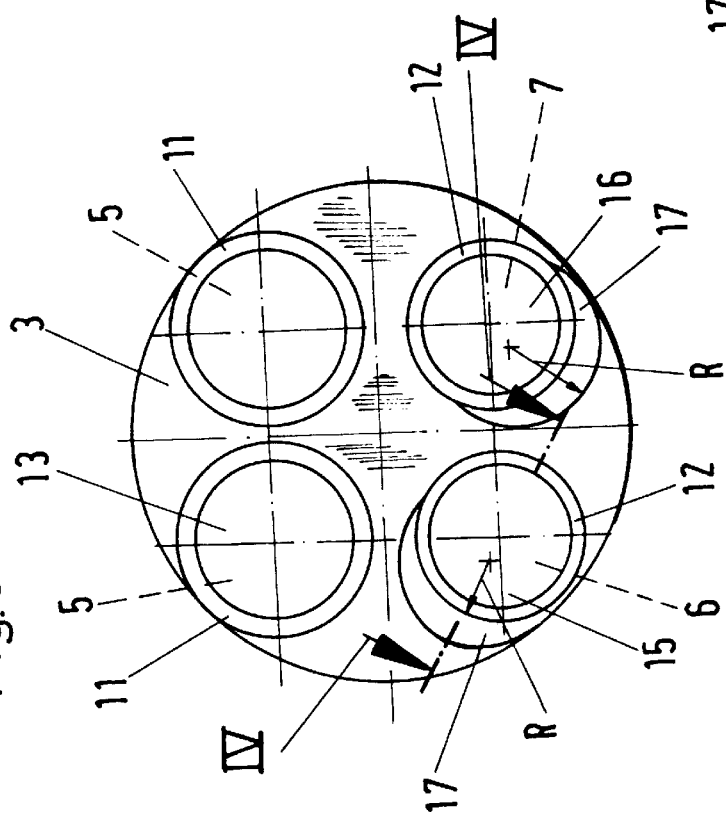
FIG. 3 is a schematic plan view showing a combustion-chamber land on a multivalve internal combustion engine according to the invention.

As shown in FIGS. 3 and 4, at least one flow cross-section 15 of the exhaust duct 8 is recessed in the combustion-chamber land 3 relative to the combustion chamber 4 and a duct-like chamfer 17 is provided on one side of this flow cross-section 15, in a region of transition to the combustion-chamber land 3. The maximum extent of this chamfer 17 in the radial direction relative to the flow cross-section 15 is indicated by a vector R which points in a direction tangential to an axis Z extending parallel to the direction of motion of the reciprocating piston 2. The unchamfered region of the combustion chamber land 3 which is opposite the chamfer 17 provides a circular arc-shaped mask 18 for the exhaust valve 6 in a first stroke region.

When a plurality of exhaust valves 6 and 7 are provided, the directions R of the chamfers 17 can differ from each other to establish a specific swirling flow D.

The combustion chamber 4 has a spark plug 19 mounted in an approximately central position.

The operation of the reciprocating-piston internal combustion engine described above is as follows. In one or more specific load ranges, a partial load range for instance, the exhaust valve lift curve A is shifted to its position A' during a downward motion of the piston 2 by the arrangement for changing the position of the valve lift curves relating to the crank angle. As a result, the exhaust valve 6 or valves 6 and 7 are open during the fresh gas intake stroke. Because of the relative orientations of the vector R of the chamfer 17 and the mask 18 with respect to the cylinder axis 2, a specific swirling flow D is established in a first stroke region of the exhaust valves 6 and 7 since the exhaust gas can leave the exhaust duct 8 only through the gaps formed between the exhaust valves 6 and 7 and the chamfers 17. The mask 18 is effective in this manner unless the valve stroke exceeds the length of the mask 18 which would allow the exhaust gas to propagate in the mask direction as well. With the embodiment shown in FIGS. 1a and 3, the positions of the vectors R of the chamfers 17 is chosen in such a way that the recirculated quantity of exhaust gas in the swirling flow D rotates about the axis Z. The valve lift curve A or of both the curves A and E may be shifted relative to the crank angle by amounts up to 60° of crank angle, preferably between 20° and 45°. This assures that a comparatively large amount of exhaust gas is internally recirculated. For a two-valve engine such as shown in FIG. 2, the intake of fresh gas through the intake duct 14 can take place either without swirl, i.e., in a manner defined exclusively by a conventional configuration of the intake duct 14, or with a swirl, the level of swirl of this flow of fresh gas generally being significantly lower than that of the recirculated flow of exhaust gas.

For multi-valve engines such as shown in FIG. 1a and 1b, the flow of fresh gas is preferably supplied in such a way that a comparatively slight tumble flow is established, i.e., the stream of fresh gas also rotates about an axis Q extending transversely to the axis Z. To influence the level of tumble, adjustable flaps, for example, can be provided in conventional manner in the outlet duct 14.

With a plurality of exhaust valves 6 and 7 as shown in FIG. 1a, the formation of a chamfer 17 for only one of the valves can be sufficient, in which case the other of the exhaust valves 6 and 7 is closed during the internal exhaust-gas recirculation, resulting in increased swirl intensity. Maintaining one of the exhaust valves 6 and 7 closed in this manner can be accomplished either by deactivating the valve by switchable hydraulic bucket tappets, for example, or by appropriate configuration of the cam shape for that valve.

Because of the swirling flow of recirculated exhaust gas along the periphery of the cylinder wall and of the fresh gas flowing in through the flow cross-section or cross-sections 13, a clear charge stratification is established in the combustion chamber 4, with an increased concentration of fresh gas occurring in the region of the spark plug 19, so that ignition is performed reliably despite the relatively large quantities of exhaust gas in the chamber. A significant reduction in fuel consumption can be achieved by recirculating a comparatively large quantity of exhaust gas, particularly in partial load ranges of the internal combustion engine in which the load demand is not high, and no rise in HC or CO emissions is observed.

In the arrangement shown in FIG. 1b, the vectors R of two chamfers 17 can be arranged in mirror-image fashion relative to one another so that two swirling flows D and D', each rotating about a corresponding axis Z and Z' parallel to the direction of motion in the cylinder, are established in opposite directions. The sum of the swirl levels here is zero. As in all the other embodiments of the invention, the density of the inflowing exhaust gas is relatively low in comparison with the fresh gas density because of the exhaust-gas temperature, i.e., the exhaust gas streams are relatively light in weight.

Consequently, they are pushed aside by the inflowing fresh gas and are taken along in diluted form in the tumbling motion of the fresh gas.

Although the invention has been described herein with reference to specific embodiments, many modifications and variations therein will readily occur to those skilled in the art. Accordingly, all such variations and modifications are included within the intended scope of the invention.

We claim:

1. A method for operating a spark-ignited reciprocating-piston internal combustion engine in which gas exchange in a combustion chamber is controlled by periodically actuated intake and exhaust valves comprising:

recirculating exhaust gas from an exhaust duct into a combustion chamber during an overlap phase between the valve lift curves for the intake and exhaust valves;

adjusting the exhaust valve lift curve in the direction of a retarded crank angle;

imposing on the recirculated exhaust gas a swirling flow which rotates about an axis extending in the direction of motion of the reciprocating piston; and imposing on fresh gas flowing in through the intake valve a flow motion to produce a charge stratification with increased fresh gas concentration in the vicinity of a spark plug as a result of the swirling flow of the exhaust gas and the flow motion of the fresh gas in the combustion chamber.

2. A method according to claim 1 including adjusting the intake valve lift curve in the retarded crank angle direction together with the exhaust valve lift curve.

3. A method according to claim 1 including producing the swirling flow of exhaust gas by an exhaust duct configuration.

4. A method according to claim 3 wherein the exhaust duct has a flow cross-section controlled by the exhaust valve which is recessed relative to the combustion chamber and wherein the recirculated exhaust gas has the swirling flow imposed upon it by a chamfer which extends over only part of the circumference of the flow cross-section.

5. A method according to claim 4 wherein at least two exhaust valves and at least two inlet valves provide communication with the combustion chamber and both exhaust valve lift curves are shifted in parallel with and together with the intake valve lift curve in the direction of a retarded crank angle.

6. A method according to claim 5 wherein the flow cross-sections for the exhaust valves have chamfers which differ in direction to produce two swirling flows rotating in directions opposite to one another about parallel axes.

7. A method according to claim 1 wherein at least two exhaust valves provide communication with the combustion chamber and wherein, when one of the exhaust-valve lift curves is adjusted in the direction of a retarded crank angle for the recirculation of exhaust gas, at least one other exhaust valve is rendered inactive.

8. A method according to claim 7 including producing the swirling flow of exhaust gas by an exhaust duct configuration in only the exhaust gas flowing in through the exhaust valve which has not been deactivated.

9. A method according to claim 1 wherein a single intake valve communicates with the combustion chamber and including imposing a swirling flow upon the fresh gas.

10. A method according to claim 1 wherein a plurality of intake valves communicate with the combustion chamber and including imposing a flow motion on the fresh gas which is a tumbling flow rotating about an axis transverse to the cylinder axis.

11. A method according to claim 10 including adjusting the intensity of the tumbling flow.

12. Apparatus for reducing fuel consumption and exhaust gas emissions in a spark-ignited reciprocating-piston internal combustion engine having a combustion chamber comprising:

intake and exhaust valves actuated periodically by at least one camshaft wherein the valve lift curves for the intake and exhaust valves have a valve overlap phase in which exhaust gas flows back out of the exhaust duct into the combustion chamber;

an arrangement for changing the position of the exhaust valve lift curve relative to the crank angle;

the exhaust duct having at least one flow cross-section in a combustion chamber land which is recessed relative to the combustion chamber;

a chamfer extending along one side of the flow cross-section in the combustion chamber land with a direction, defined by the extent of the chamfer, which is tangential to an axis extending in the direction of motion of the reciprocating piston.

13. Apparatus according to claim 12 wherein the arrangement for changing the position of the exhaust valve lift curve relative to the crank angle provides a synchronous change of the intake valve lift curve relative to the crank angle.

14. Apparatus according to claim 12 wherein the combustion chamber communicates with a plurality of exhaust valves each having a chamfer extending along one side of a corresponding flow section and wherein the directions defined by the extent of the chamfers for the flow sections differ from each other.

15. Apparatus according to claim 12 wherein a plurality of exhaust valves communicates with the combustion chamber and including a deactivation arrangement for decoupling at least one of the exhaust valves from the periodic drive by the camshaft.

16. Apparatus according to claim 12 wherein a plurality of exhaust valves communicates with the combustion chamber and at least one of the exhaust valves is driven by a camshaft cam having a flank which closes that valve prematurely relative to another exhaust valve.

* * * * *